(12) United States Patent
Fortier

(10) Patent No.: US 8,342,858 B2
(45) Date of Patent: Jan. 1, 2013

(54) PATCH PANEL FOR USE IN DELIVERING VOICE AND DATA TO END USERS

(75) Inventor: Stéphane Maxime François Fortier, Breakyville (CA)

(73) Assignee: BCE Inc., Verdun, Québec (CA)

( * ) Notice: Subject to any disclaimer, the term of this patent is extended or adjusted under 35 U.S.C. 154(b) by 435 days.

(21) Appl. No.: 12/750,070

(22) Filed: Mar. 30, 2010

(65) Prior Publication Data

US 2010/0254374 A1  Oct. 7, 2010

Related U.S. Application Data

(60) Provisional application No. 61/165,664, filed on Apr. 1, 2009.

(51) Int. Cl.
*H01R 29/00* (2006.01)

(52) U.S. Cl. .......................................... 439/49; 439/676

(58) Field of Classification Search .................. 439/49, 439/50, 540.1, 638, 502, 676
See application file for complete search history.

(56) References Cited

U.S. PATENT DOCUMENTS

| | | | |
|---|---|---|---|
| 7,491,066 B1 * | 2/2009 | Chen | 439/49 |
| 7,677,898 B2 * | 3/2010 | Rui et al. | 439/49 |
| 7,927,107 B2 * | 4/2011 | Peng et al. | 439/49 |
| 8,221,159 B2 * | 7/2012 | Knepp | 439/540.1 |
| 2007/0243725 A1 * | 10/2007 | Nordin et al. | 439/49 |

OTHER PUBLICATIONS

"RJ45 Splitter for Ethernet Cable Sharing (Connect Two Ethernet Signals by a Single Network Cable)", Copyright © 2005~2010 DualComm Technology, Inc. All Rights Reserved, http://www.dualcomm.com/DC102.htm, 3 pages.

* cited by examiner

*Primary Examiner* — Khiem Nguyen

(57) ABSTRACT

A patch panel that comprises a housing exhibiting a front face, in addition to first, second and third connectors. Each second connector corresponds to one of the first connectors, while each third connector also corresponds to one of the first connectors. Each first, second and third connector provides access, via the front face of the housing, to a respective set of terminals disposed at a set of positions relative to the respective connector. Each terminal in a first subset of the terminals to which one of the first connectors provides access is connected to a corresponding terminal to which the corresponding second connector provides access. Each terminal in a second, complementary subset of the terminals to which that same one of the first connectors provides access is connected to a corresponding terminal to which the corresponding third connector provides access.

30 Claims, 6 Drawing Sheets

PATCH PANEL FOR USE IN DELIVERING VOICE AND DATA TO END USERS

CROSS-REFERENCE TO RELATED APPLICATION

The present application claims the benefit under 35 USC §119(e) of U.S. Provisional Patent Application Ser. No. 61/165,664, filed Apr. 1, 2009, hereby incorporated by reference herein.

FIELD

The present invention relates to the delivery of communications services and, in particular, to a patch panel for use at a customer premises.

BACKGROUND

Today, many multi-user units, such as multi-dwelling units (MDUs) and enterprises, are furnished with the necessary equipment to allow the delivery of data services including Internet access. The Internet is frequently also relied upon by residential and business users for telephony, i.e., voice communication. However, customers are realizing that by using an Internet connection to place and receive voice calls, the telephony experience is subject to unpredictability and wide variations in quality, which can be unacceptable in some cases. Also, the profile of certain data customers who use the Internet for telephony is that they seek added survivability in case of failures. To this end, for many customers with access to data services, it is recommended that they be provided with a separate connection to a telephony infrastructure. However, this comes at the expense of having to lay additional cabling throughout the building, that runs in parallel to the existing wiring used for data services. The added wiring can also be unpleasant for aesthetic reasons. A solution to this problem would therefore be welcomed by the industry.

SUMMARY OF THE INVENTION

A first broad aspect of the present invention seeks to provide a patch panel, which comprises a housing exhibiting a front face; a plurality of first connectors, each said first connector providing external access via the front face to a set of conductor terminals, the set of conductor terminals including a first subset and a second subset; a plurality of second connectors, each said second connector corresponding to one of the first connectors, each said second connector providing external access via the front face to a set of conductor terminals, the set of conductor terminals to which said second conductor provides access via the front face being connected by respective conductive pathways to the first subset of conductor terminals to which the corresponding one of the first connectors provides access via the front face; and a plurality of third connectors, each said third connector corresponding to one of the first connectors, each said third connector providing external access via the front face to a set of conductor terminals, the set of conductor terminals to which said third conductor provides access via the front face being connected by respective conductive pathways to the second subset of conductor terminals to which the corresponding one of the first connectors provides access via the front face.

A second broad aspect of the present invention seeks to provide an architecture, which comprises a first patch panel and a second patch panel. Each of the first and second patch panel comprises a housing exhibiting a front face; a plurality of first connectors, each said first connector providing external access via the front face to a set of conductor terminals, the set of conductor terminals including a first subset and a second subset; a plurality of second connectors, each said second connector corresponding to one of the first connectors, each said second connector providing external access via the front face to a set of conductor terminals, the set of conductor terminals to which said second conductor provides access via the front face being connected by respective conductive pathways to the first subset of conductor terminals to which the corresponding one of the first connectors provides access via the front face; and a plurality of third connectors, each said third connector corresponding to one of the first connectors, each said third connector providing external access via the front face to a set of conductor terminals, the set of conductor terminals to which said third conductor provides access via the front face being connected by respective conductive pathways to the second subset of conductor terminals to which the corresponding one of the first connectors provides access via the front face. The architecture further comprises a set of cables connecting the first connectors of the first patch panel with respective ones of the first connectors of the second patch panel.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
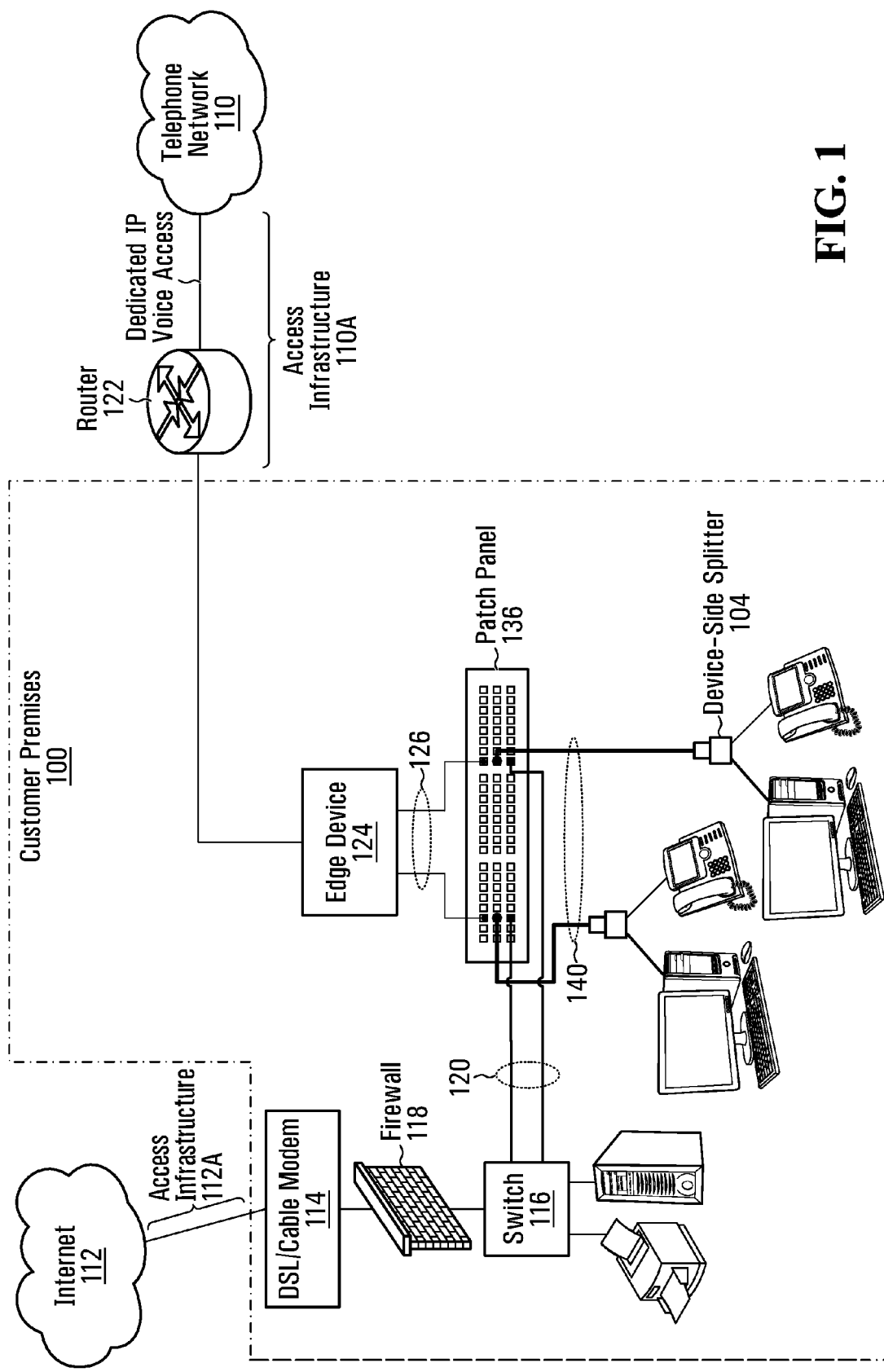
FIG. 1 is a block diagram showing a network architecture for the delivery of data and voice services to a customer premises, in accordance with a specific non-limiting embodiment of the present invention.

With reference to FIG. 1, there is shown a network architecture within which a patch panel 136 in accordance with non-limiting embodiments of the present invention can be used. In this network architecture, users at a customer premises 100 have access to telephony devices (IP phones, etc.) for exchanging voice signals, as well as data devices (computers, etc.) for exchanging data signals. The customer premises 100 may be in a private residence, an apartment building or a small, medium or large business (enterprise).

In the network architecture of FIG. 1, the data signals and the voice signals are exchanged with the customer premises 100 over different paths. Specifically, data signals are exchanged over the Internet 112 via an access infrastructure 112A owned/operated by a data service provider. For their part, voice signals are exchanged over a telephone network 110 (which may include a central office) via an access infrastructure 110A owned/operated by a voice service provider. The data service provider and the voice service provider may be the same entity or they may be different entities. The approach of keeping the two types of signals (voice and data) separate can be advantageous, as it allows better maintenance/control over quality of service, as well as improved survivability in case of failures. Also, a customer with access to data services does not need to overhaul his/her existing internal data network configuration in order to gain access to voice services.

Although they travel along different paths, the voice and data signals may nevertheless be delivered using the same underlying packet-based technology. For example, the voice signals could be delivered over the access infrastructure 110A as digital streams of packets. However, this does not change the fact that the content of the signals delivered over the access infrastructure 110A are voice signals. On the other hand, nothing prevents information carried by the packets over the access infrastructure 112A from including voice segments. However, the delivery of telephony services over the Internet 112 tends not to be as reliable as over a dedicated telephony network. Thus, in the following description, reference to "voice signals" is made to refer to signals traveling over a link dedicated to voice traffic, regardless of the format of those signals, while reference to "data signals" is made to refer to signals traveling over a link to a data network, regardless of the content of those signals.

With continued reference to FIG. 1, at the customer premises 100, and first considering a downstream direction of communication (i.e., towards the customer premises 100), a data signal arrives from the Internet 112 (or another data network) via the access infrastructure 112A. Access equipment at the customer premises 100 processes the incoming data signal. Any suitable access equipment may be used, including but not limited to a DSL or cable modem 114 in combination with an Ethernet switch 116 (and possibly also other components such as a firewall 118). The data signal can be placed onto one of several cables 120 terminated by respective terminations. The cables 120 can be Cat 5/5e cables and the terminations can be RJ-45 plugs. Other cable types and terminations are of course possible.

Additionally, and still in the downstream direction of communication, a voice signal arrives from a dedicated VoIP router 122 which itself may connect to a central office 110 or outside plant equipment through the access infrastructure 110A. An edge device 124 at the customer premises processes the voice signal. The edge device 124 may incorporate a layer-2 Ethernet switch or such a component may be external to the edge device 124. The voice signal is switched onto an appropriate one of several cables 126 terminated by respective terminations. The cables 126 can be Cat 5/5e cables and the terminations can be RJ-45 plugs. Other cable types and terminations are of course possible. In addition to channeling the voice signals from the router 122 to the customer premises 100, the edge device 124 can provide electrical power via the cables 126.

Figure 2:
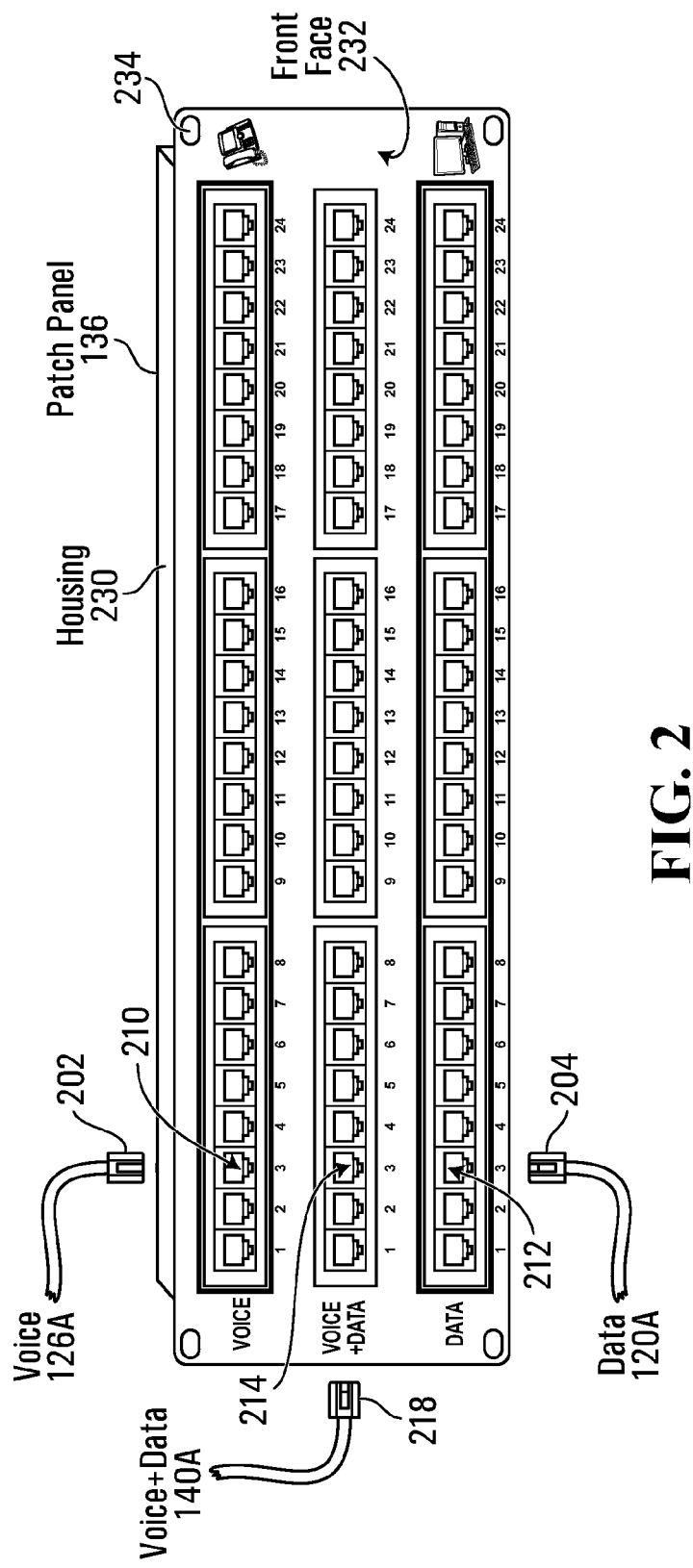
FIG. 2 shows a front face of a patch panel used in the architecture of FIG. 1, in accordance with a specific non-limiting embodiment of the present invention.

A patch panel 136 at the customer premises 100 has sockets (jacks) on its front face 232 for receiving the cables 120, 126. The sockets include voice sockets (top row), data sockets (bottom row) and voice/data sockets (middle row). The voice sockets receive the cables 126 carrying voice signals and the data sockets receive the cables 120 carrying data signals, while from the voice/data sockets emerge individual ones of a set of cables 140 combinedly carrying voice and data signals. In particular, and with additional reference to FIG. 2, a cable 126A (which is one of the cables 126 carrying voice signals) is terminated by a plug 202 that is received by a voice socket 210 and a cable 120A (which is one of the cables 120 carrying data signals) is terminated by a plug 204 that is received by a data socket 212, while out of a voice/data socket 214 of the patch panel 136 emerges another cable 140A (which is one of the cables 140 combinedly carrying voice and data signals) terminated by a plug 218.

The cable 140A emerging from the voice/data socket 214 combinedly carries the voice and data signals originally carried by the two separate cables 126A, 120A, respectively. The cable 140A leads to a device-side splitter 104 which is connected to a telephony device 106 (e.g., an IP phone) and a data device 108 (e.g., a computer) associated with a particular user. The cabling between the device-side splitter 104 and the patch panel 136 can include Cat 5/5e cables terminated by RJ-45 plugs, although other cable types and terminations are of course possible. For example, in the non-limiting embodiment shown in FIG. 3, the cable 140A is actually part of the splitter 104, although in other embodiments the cable 140A could be connectable and disconnectable from the remainder of the splitter 104. It should also be appreciated that other users have similar devices which are connected to the patch panel 136 via associated splitters and other ones of the cables 140.

The splitter 104 is used in the downstream direction to separate the combined voice/data signal from the patch panel 136 into its voice and data components, and is used in the upstream direction to combine a voice signal received from the telephony device 106 and a data signal received from the data device 108 into a combined voice/data signal transported by the cable 140A. The splitter 104 includes a first socket 304 connected to the data device 108 via a cable 302 having a termination that mates with socket 304, and a second socket 308 connected to the telephony device 106 via a cable 306 having a termination that mates with socket 308. The cables 302, 306 can be Cat 5/5e cables and the terminations can be RJ-45 terminations, although other cable types and terminations are of course possible.

The internal wiring of the splitter 104 is such that the data signal forming part of the combined voice/data signal carried by cable 140A appears on the cable 302 emerging from the first socket 304, while the voice signal forming part of the combined voice/data signal carried by cable 140A appears on the cable 306 emerging from the second socket 308. Those skilled in the art will appreciate that in the opposite direction of communication, the splitter 104 functions as a combiner.

It should further be apparent that certain constraints may need to be respected having regard to cable length, particularly in the case of Cat 5/5e cables that are specified to a length of 100 m. Specifically, there may be a maximum acceptable linear distance between the telephony device 106 and the edge device 124 (or the external layer-2 router, if applicable). Also, there may be a maximum acceptable linear distance between the data device 108 and the switch 116. The patch panel 136 should therefore be positioned within the customer premises in such a way as to respect these parameters, thereby to allow certain performance standards to be maintained. Naturally, if different cables types are used, then different length restrictions/specifications may apply. It should be appreciated that a mix of cable types may also be employed.

Referring again to FIG. 2, the patch panel 136 includes a housing 230 exhibiting the aforementioned front face 232. Optionally, screw holes 234 may be provided on the front face 232 to facilitate mounting in a cabinet or on a wall. Thus, it is possible that the top, bottom, back and side faces may not be visible during use. Moreover, the depth of the patch panel 136 as measured from the front face 232 can be as little as 2 inches, or 1 inch or even less, thus providing the patch panel 136 with a conveniently small form factor and easy access to multiple voice, data and voice/data sockets from a common front face. Of course, a deeper patch panel 136 can be constructed if desired or if suitable to meet certain structural requirements.

The fact that the voice, data and voice/data sockets are all accessible via the front face 232 of the housing 230 facilitates initial connection, as well as improves connection verification. Most of all, this type of arrangement saves both space and cost, since no special design of the cabinet is required beyond perhaps providing a door to access the front face 232. Since no cables need be attached to the top, bottom, back or side faces, the form factor of the patch panel 136 can be kept to a minimum.

The voice sockets (top row, including voice socket 210), the data sockets (bottom row, including data socket 212) and the voice/data sockets (middle row, including voice/data socket 214) can be arranged in respective rows, with corresponding triples of sockets being aligned column-wise, thus forming a matrix. It should be understood that the dimensionality of the matrix (i.e., the number of rows or columns) is not particularly limited by the present invention. Also, the rows may be vertically or horizontally disposed, and indeed many other arrays, patterns and arrangements are possible, depending on operational requirements. In particular, the sockets of a certain type may be disposed in one or multiple rows, they may be evenly or unevenly spaced, etc.

It may be advantageous, nonetheless, to preserve an intuitive spatial relationship between a given voice/data socket and the voice and data sockets to which the given voice/data socket is connected via internal wiring of the patch panel 136.

Additionally, to facilitate the connection of individual cables to the patch panel 136 by experienced and unexperienced operators alike, it is within the scope of the invention to provide simple visual indicators (e.g., pictograms/pictures/words) in proximity to individual sockets that display the type of signal carried by the cables to which those sockets are intended to be connected. Thus, in the case of the cable 120A leading to/from the switch 116, a picture of a computer or the word "DATA" could be illustrated/printed in a vicinity of one or more of the data sockets (i.e., in the bottom row). Similarly, in the case of the cable 126A leading to/from the edge device 124, a picture of a telephone or the word "VOICE" could be illustrated/printed in a vicinity of one or more of the voice sockets (i.e., in the top row). As for the middle row, it may be useful to keep it free and clear of pictograms/pictures/words, or alternatively one could provide an illustration including both a computer and a telephone (possibly slightly reduced in size), or any other picture or expression that would convey the combined signal carrying characteristics of the cables that are to be connected to the voice/data sockets in the second row. By using the above approach, individuals at the customer premises, who may have limited experience with connecting data and telephony equipment, may nevertheless be empowered to quickly and successfully connect their equipment to the patch panel 136.

Figure 4:
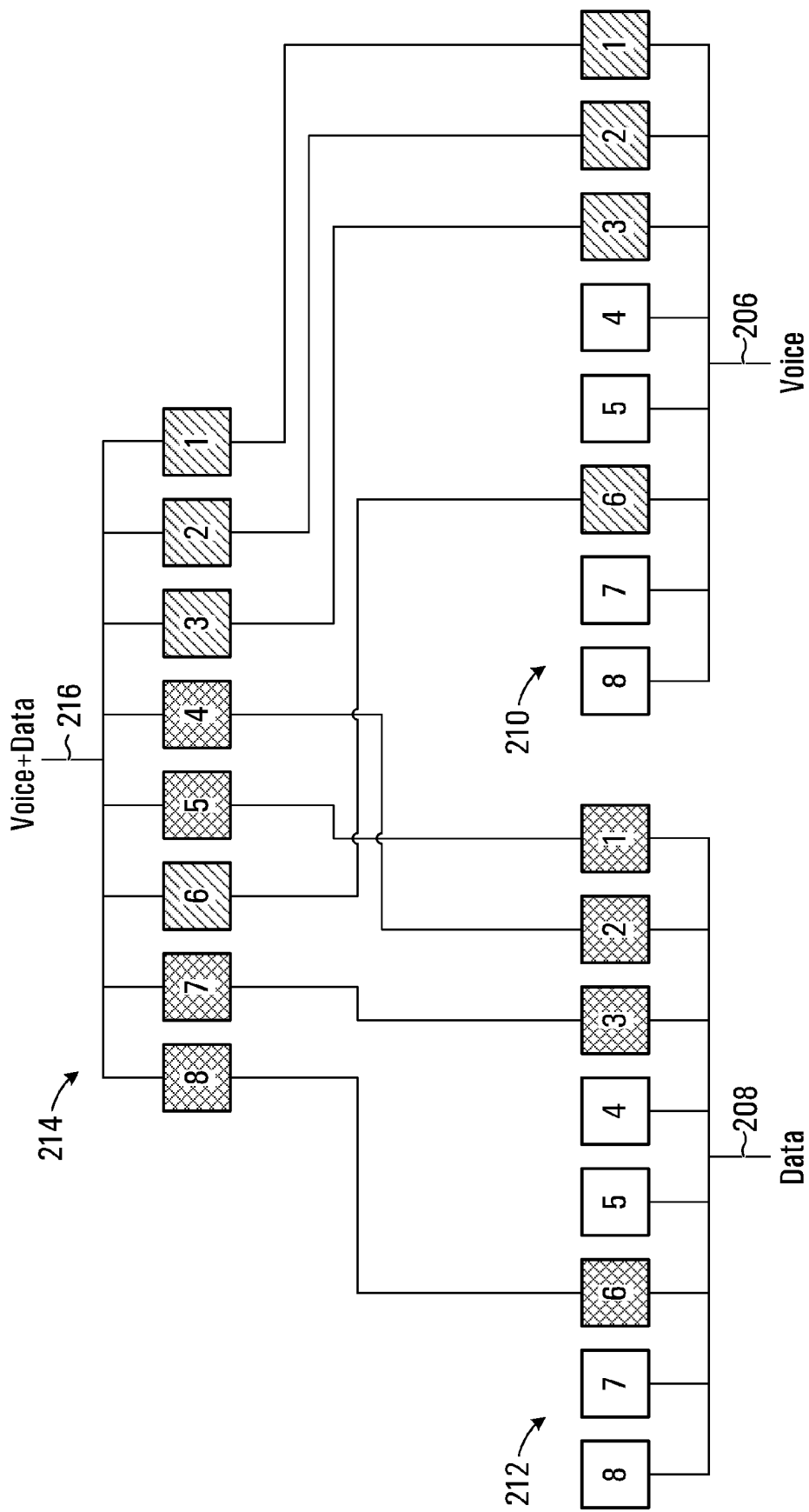
FIG. 4 is a schematic showing example internal wiring of the patch panel of FIG. 2, in accordance with a specific non-limiting embodiment of the present invention.

The internal wiring of the patch panel 136 that connects voice socket 210, data socket 212 and voice/data socket 214 is shown schematically in FIG. 4. The sockets 210, 212 or 214 are all identical, and each has a set of conductor terminals disposed at various positions relative to the socket in question. For the purposes of this description, the positions are numbered 1, 2, 3, 4, 5, 6, 7 and 8, where each number corresponds to a predetermined position of a conductor terminal relative to the socket in question. These eight positions are shown schematically in FIG. 4 as being in two dimensions, but those skilled in the art will appreciate that in actuality they are distributed in three-dimensional space.

The sockets being described here in connection with the patch panel 136 are made to receive a Cat 5/5e cable having an RJ-45 plug. The RJ-45 plug has a set of complementary conductor terminals that mate with the conductor terminals of the socket. The Cat 5/5e cables themselves each contain a number of conductors that are individually insulated, bundled and surrounded by a sheath, with the conductors being arranged such that if the ends of the cable are terminated by identical RJ-45 plugs, the conductor occupying position X relative to one plug will also occupy position X relative to the other plug. Of course, it will be appreciated that different types of sockets (designed to receive different types of cables) may have different numbers of conductor terminals and/or the conductor terminals may be disposed differently relative to the socket.

It is remarked that for voice socket 210, only a subset of the 8 available positions are occupied by conductor terminals electrically connected to conductor terminals of the voice/data socket 214. In this case, positions 1, 2, 3 and 6 are occupied by conductor terminals leading to the voice/data socket 214. The other positions (namely 4, 5, 7 and 8) are vacant. Thus, the cable 126A effectively carries a voice signal using only four conductor terminals. In particular, electrically conductive pathways (e.g., wires or traces) passing through the patch panel 136 connect the conductor terminals occupying positions 1, 2, 3 and 6 relative to the voice socket 210 to the conductor terminals occupying positions 1, 2, 3 and 6 relative to the voice/data socket 214. However, it is not necessary that the conductor terminals connected to one another occupy exactly the same positions. For example, electrically conductive pathways may connect the conductor terminals occupying any set of positions relative to the voice socket 210 to the conductor terminals occupying any other (like-numbered) group of positions relative to the voice/data socket 214.

Similarly, it is remarked that for data socket 212, only a subset of the 8 available positions are occupied by conductor terminals electrically connected to conductor terminals of the voice/data socket 214. In this case, positions 1, 2, 3 and 6 are occupied by conductor terminals leading to the voice/data socket 214. The other positions (namely 4, 5, 7 and 8) are vacant. Thus, the cable 120A effectively carries a data signal using only four conductor terminals. In particular, electrically conductive pathways (e.g., wires or traces) passing through the patch panel 136 connect the conductor terminals occupying positions 1, 2, 3 and 6 relative to the data socket 212 to the conductor terminals occupying positions 5, 4, 7 and 8 relative to the voice/data socket 214. In general, electrically conductive pathways may connect the conductor terminals occupying any set of positions relative to the data socket 212 to the conductor terminals occupying any other (like-numbered) group of positions relative to the voice/data socket 214, provided of course that the sets of conductor terminals of the voice-data socket 214 connected to the voice socket 210 and the data socket 212 are different.

To summarize the present non-limiting configuration, conductor terminals 1, 2, 3 and 6 of the voice/data socket 214 are associated with a voice signal, while conductor terminals 4, 5, 7 and 8 are associated with a data signal. The above-described wiring arrangement can be replicated for each triple of a voice, data and voice/data socket (i.e., each column of 3 sockets in the illustration of FIG. 2).

Figure 3:
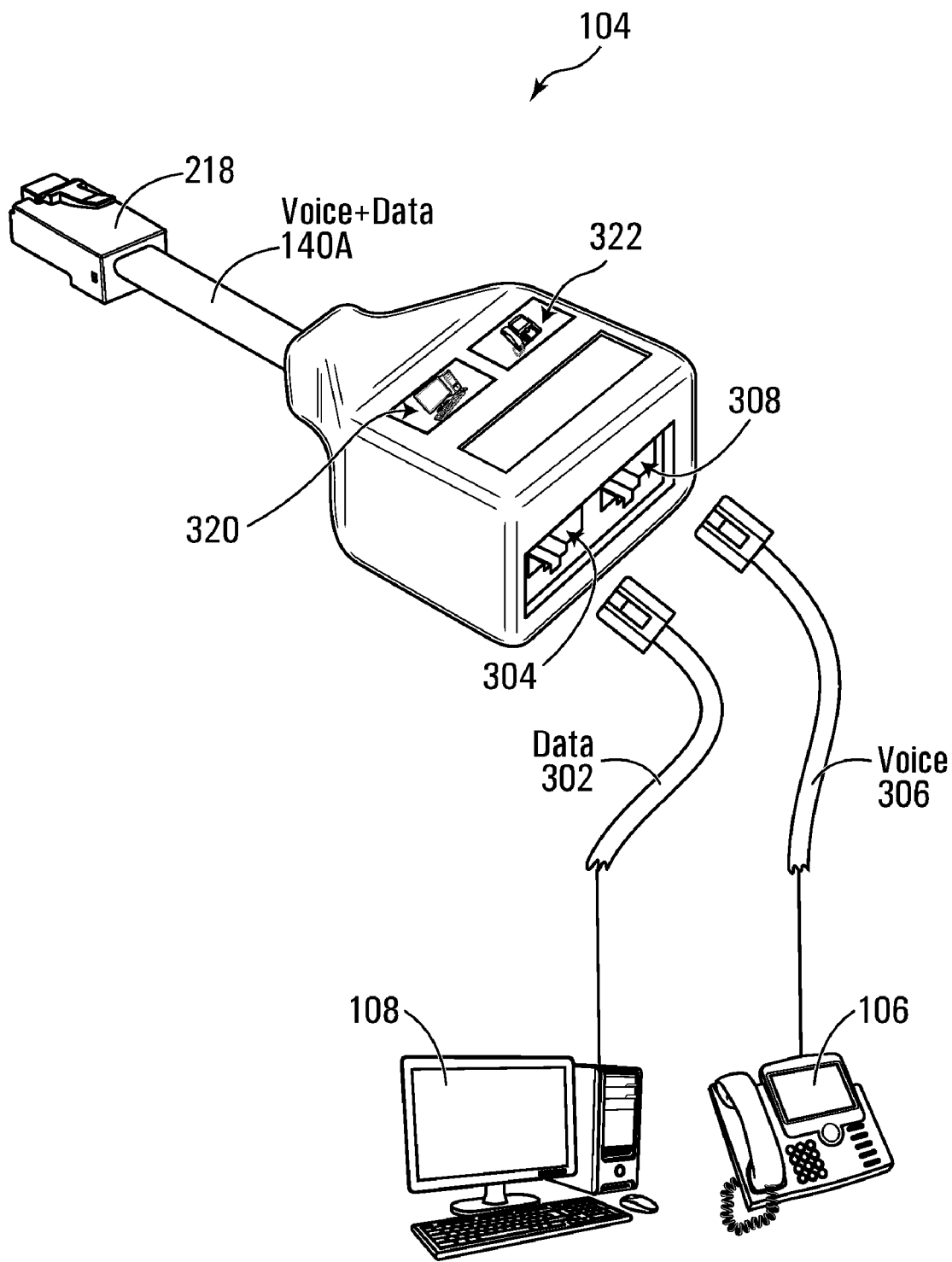
FIG. 3 shows a perspective view of a splitter that is complementary to the patch panel of FIG. 2, in accordance with a specific non-limiting embodiment of the present invention.

FIG. 3 shows the device-side splitter 104 in accordance with a non-limiting embodiment of the present invention. It is recalled that the splitter 104 in the illustrated embodiment comprises the sockets 304, 308. The socket 304 mates with the plug that terminates the cable 302 (carrying a data signal to/from the data device 108). The socket 308 mates with the plug that terminates the cable 306 (carrying a voice signal to/from the telephony device 106).

To facilitate the initial connection of the telephony device 106 and the data device 108 to the splitter 104, it is within the scope of the invention to provide simple visual indicators (e.g., pictograms/pictures/words) in proximity to individual sockets that display the type of signal carried by the cables to which those sockets are intended to be connected. Thus, in the case of the cable 302 leading to the data device 108, a picture 320 of a computer (or the word "DATA") could be placed in a vicinity of socket 304. Similarly, in the case of the cable 306 leading to the telephony device 106, a picture 322 of a telephone (or the word "VOICE") could be placed in a vicinity of socket 308. As for the cable 140A leading to the patch panel 136, it may be useful to keep it free and clear of pictograms, or alternatively one could provide an illustration including both a computer and a telephone (possibly slightly reduced in size), or any other graphical or textual expression that would convey the combined signal carrying characteristics of the cable 140A that is to be connected to the patch panel 136. By using the above approach, individuals at the customer premises, who may have limited experience with connecting data and telephony equipment, may nevertheless be empowered to quickly and successfully connect the splitter 104 to the data and telephony devices 106, 108, as well as to the patch panel 136.

Figure 5:
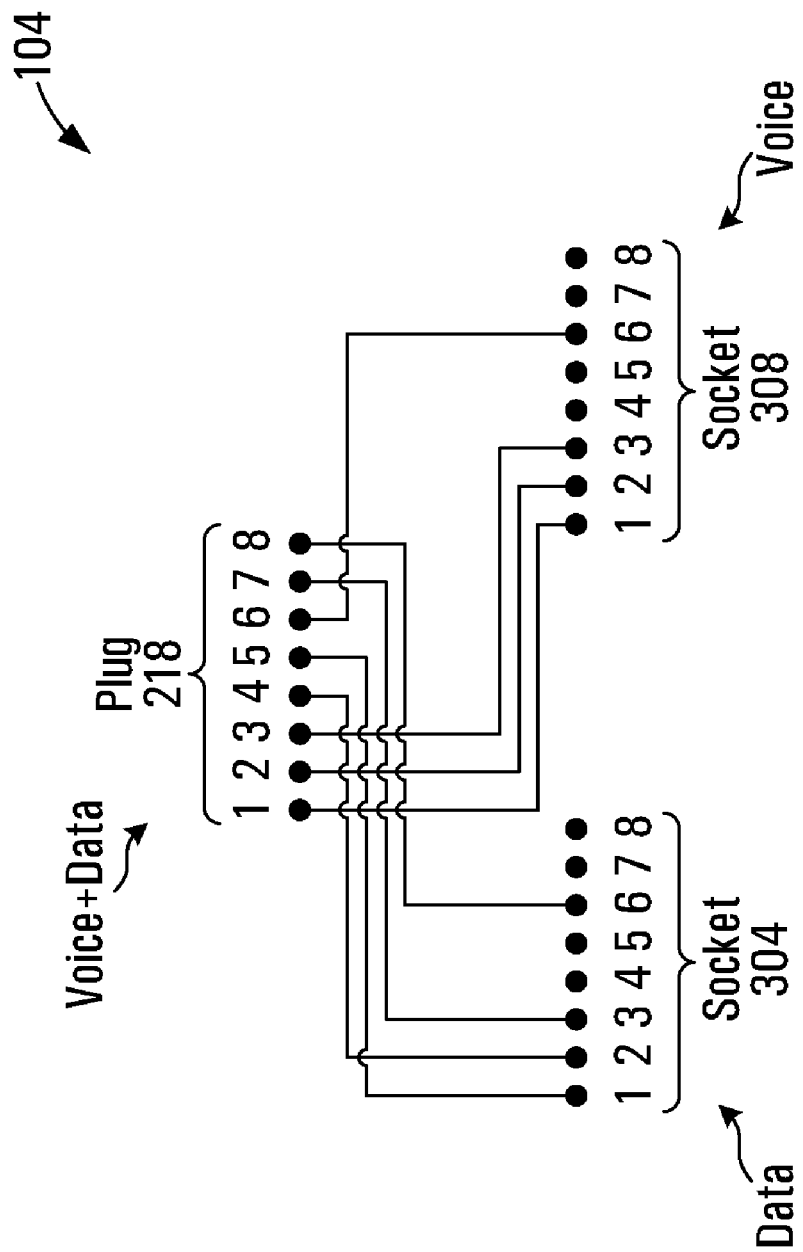
FIG. 5 is a schematic showing example internal wiring of the splitter of FIG. 3, in accordance with a specific non-limiting embodiment of the present invention.

The internal wiring of the splitter 104 is shown schematically in FIG. 5. Firstly, the plug 218 terminating the cable 140A is designed to mate with the voice/data socket 214 of the patch panel 136. The plug 218 includes a set of conductor terminals disposed at various positions relative to the plug 218. The positions are numbered 1, 2, 3, 4, 5, 6, 7 and 8, where each number corresponds to a predetermined position of a conductor terminal relative to the plug 218. These eight positions are shown schematically in FIG. 5 as being in two dimensions, but those skilled in the art will appreciate that in actuality they are distributed in three-dimensional space. When the plug 218 is received by the voice/data socket 214, the conductor terminals occupying positions 1 through 8 of the plug 218 electrically connect to the previously described conductor terminals occupying positions terminals 1 through 8 of the voice/data socket 214 (see FIG. 4).

Continuing with the description of FIG. 5, the sockets 304, 308 are identical, and each has a set of conductor terminals disposed at various positions relative to the socket in question. For the purposes of this description, the positions are numbered 1, 2, 3, 4, 5, 6, 7 and 8, where each number corresponds to a predetermined position of the conductor terminal relative to the socket in question. These eight positions are shown schematically in FIG. 5 as being in two dimensions, but those skilled in the art will appreciate that in actuality they are distributed in three-dimensional space.

The sockets 304, 308 are made to receive a Cat 5/5e cable having an RJ-45 plug. The RJ-45 plug has a set of complementary conductor terminals that mate with the conductor terminals of the socket. The Cat 5/5e cables themselves each contain eight conductors that are individually insulated, bundled and surrounded by a sheath, with the conductors being arranged such that if the ends of the cable are terminated by identical RJ-45 plugs, the conductor occupying position X relative to one plug will also occupy position X relative to the other plug. Of course, it will be appreciated that different types of sockets (designed to receive different types of cables) may have different numbers of conductor terminals and/or the conductor terminals may be disposed differently relative to the socket.

It is remarked that for socket 308 (connected via the cable 306 to the telephony device 106), only a subset of the 8 available positions are occupied by conductor terminals electrically connected to conductor terminals of the plug 218. In this case, positions 1, 2, 3 and 6 are occupied by conductor terminals leading to the plug 218. The other positions (namely 4, 5, 7 and 8), are vacant. Thus, the cable 306 effectively carries a voice signal using only four conductor terminals, which can occupy the same positions as do the conductor terminals of the voice socket 210 that carry a voice signal.

Similarly, it is remarked that for socket 304 (connected via the cable 302 to the data device 108), only a subset of the 8 available positions are occupied by conductor terminals electrically connected to conductor terminals of the plug 218. In this case, positions 1, 2, 3 and 6 are occupied by conductor terminals leading to the plug 218. The other positions (namely 4, 5, 7 and 8) are vacant. Thus, the cable 302 effectively carries a data signal using only four conductor terminals, which can occupy the same positions as do the conductor terminals of the data socket 212 that carry a data signal.

Figure 6:
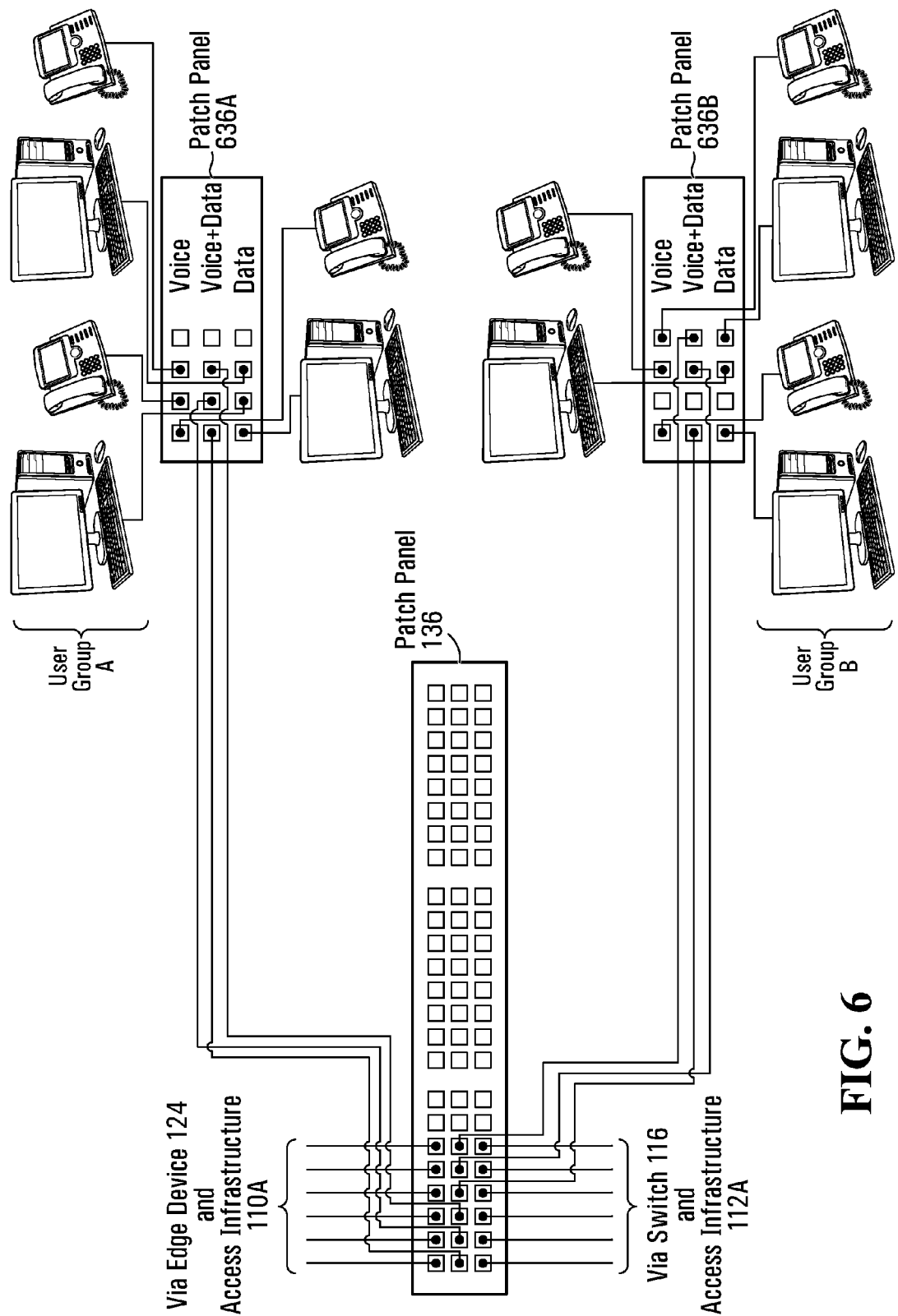
FIG. 6 is a block diagram showing the use of cascaded patch panels of the type shown in FIG. 2, in accordance with a specific non-limiting embodiment of the present invention.

It should be appreciated that the patch panel 136 itself functions as a parallel set of Y-splitters in a convenient form factor, while preserving previously existing wiring that would have been laid throughout the enterprise for data access. As a corollary, when multiple users are co-located, instead of using a Y-splitter (e.g., the splitter 104) for each such nearby user, one can actually connect a second patch panel on the device side. As such, and with reference to FIG. 6, one can employ a first patch panel 136 to merge/split voice and data signals on the access infrastructure side, as well as a second patch panel 636A to merge/split voice and data traffic at the location of user group A and a third patch panel 636B to merge/split voice and data traffic at the location of user group B. Patch panels 636A, 636B can be identical to patch panel 136, or they can be reduced in the number of "columns" (triples of sockets) they contain. This can allow greater convenience of installation at the locations of user groups A and B, as well as greater space savings and a greater ease of maintenance of the wiring layout on the device side.

Of course, other types of connectors, plugs and cables can be used. Where the cables carrying either only voice or only data signals have, respectively, N and M useful wires, the cable combinedly carrying voice and data signals should have at least N+M wires. Aside from this, however, the present invention does not limit the number of wires per cable or the number of wires per subset. In particular, M and N need not be the same. Also, it should be appreciated that certain cables may consist of enough wires to combinedly carry three (or more) separate signals (e.g., voice, data and video). Thus, in an extension of the matrix of sockets on patch panel 136, four rows of aligned sockets may be provided, namely a row of voice sockets, a row of data sockets, a row of video sockets and a row of voice/data/video sockets. Other embodiments are of course possible.

It should be appreciated that the aforementioned description merely pertains to an example embodiment, and that many variations are possible and are within the scope of the present invention.

In particular, one or more signals may be wireless signals, either between the access infrastructures 110A, 112A and the customer premises 100, or between the patch panel 136 and the devices 106, 108. In an embodiment that includes the transmission of wireless signals, the network architecture could be designed to include suitable wireless transponders, conversion circuitry, etc. where appropriate.

Certain adaptations and modifications of the described embodiments can be made. Therefore, the above discussed embodiments are to be considered illustrative and not restrictive.

The invention claimed is:

1. A patch panel, comprising:
   a housing exhibiting a front face;
   a plurality of first connectors, each said first connector providing external access via the front face to a set of conductor terminals, the set of conductor terminals including a first subset and a second subset;
   a plurality of second connectors, each said second connector corresponding to one of the first connectors, each said second connector providing external access via the front face to a set of conductor terminals, the set of conductor terminals to which said second connector provides access via the front face being connected by respective conductive pathways to the first subset of conductor terminals to which the corresponding one of the first connectors provides access via the front face; and
   a plurality of third connectors, each said third connector corresponding to one of the first connectors, each said third connector providing external access via the front face to a set of conductor terminals, the set of conductor terminals to which said third connector provides access via the front face being connected by respective conductive pathways to the second subset of conductor terminals to which the corresponding one of the first connectors provides access via the front face.

2. The patch panel defined in claim 1, the first subset of conductor terminals to which each first connector provides access via the front face being disposed at a first set of positions relative to said first connector, the second subset of conductor terminals to which each first connector provides access via the front face being disposed at a second set of positions relative to said first connector, the conductor terminals to which each second connector provides access via the front face being disposed at a third set of positions relative to said second connector and the conductor terminals to which each third connector provides access via the front face being disposed at a fourth set of positions relative to said third connector, wherein:
   the first set of positions is identical to the third set of positions.

3. The patch panel defined in claim 2, wherein the first set of positions is also identical to the fourth set of positions.

4. The patch panel defined in claim 3, wherein the third set of positions is identical to the fourth set of positions.

5. The patch panel defined in claim 1, the first subset of conductor terminals to which each first connector provides access via the front face being disposed at a first set of positions relative to said first connector, the second subset of conductor terminals to which each first connector provides access via the front face being disposed at a second set of positions relative to said first connector, the conductor terminals to which each second connector provides access via the front face being disposed at a third set of positions relative to said second connector and the conductor terminals to which each third connector provides access via the front face being disposed at a fourth set of positions relative to said third connector, wherein:
   the conductive pathways include conductive pathways connecting the conductor terminals occupying the third set of positions relative to a given second connector to the conductor terminals occupying the first set of positions relative to the corresponding first connector.

6. The patch panel defined in claim 5, wherein the conductive pathways include conductive pathways connecting the conductor terminals occupying the fourth set of positions relative to a given second connector to the conductor terminals occupying the second set of positions relative to the corresponding first connector.

7. The patch panel defined in claim 6, wherein the conductive pathways connecting the conductor terminals occupying the third set of positions relative to the given second connector to the conductor terminals occupying the first set of positions relative to the corresponding first connector include:
   conductive pathways connecting each conductor terminal occupying a given position relative to the given second connector to the conductor terminal occupying the same position relative to the corresponding first connector.

8. The patch panel defined in claim 1, wherein the first connectors are arranged in an array of at least one row along the front face.

9. The patch panel defined in claim 1, wherein the second connectors are arranged in an array of at least one row along the front face.

10. The patch panel defined in claim 1, wherein the third connectors are arranged in an array of at least one row along the front face.

11. The patch panel defined in claim 1, wherein the first connectors are arranged in an array of at least one first row along the front face, wherein the second connectors are arranged in an array of at least one second row along the front face, wherein the third connectors are arranged in an array of at least one third row along the front face and wherein corresponding first, second and third connectors in the at least one first, second and third rows are aligned perpendicularly to the at least one first, second and third rows.

12. The patch panel defined in claim 1, further comprising a first visual indicator disposed on the housing, the first visual indicator being closer to at least one of the second connectors than to any of the third connectors, the first visual indicator being indicative of a type of signal intended to be exchanged with equipment connectable via the second connectors.

13. The patch panel defined in claim 12, further comprising a second visual indicator disposed on the housing, the second visual indicator being closer to at least one of the third connectors than to any of the second connectors, the second visual indicator being indicative of a type of signal intended to be exchanged with equipment connectable via the third connectors.

14. The patch panel defined in claim 13, wherein one of the first visual indicator and the second visual indicator conveys an illustration of a telephony device.

15. The patch panel defined in claim 14, wherein one of the first visual indicator and the second visual indicator includes a textual expression indicating that the type of signal intended to be exchanged with equipment connectable via the second connectors is a telephony signal.

16. The patch panel defined in claim 14, wherein the other of the first visual indicator and the second visual indicator conveys an illustration of a data device.

17. The patch panel defined in claim 16, wherein the other of the first visual indicator and the second visual indicator includes a textual expression indicating that the type of signal intended to be exchanged with equipment connectable via the second connectors is a data signal.

18. The patch panel defined in claim 1, wherein the first, second and third connectors are sockets capable of receiving a plug.

19. The patch panel defined in claim 1, further comprising a plurality of screw holes on the front face to enable mounting in a cabinet or on a wall.

20. The patch panel defined in claim 1, wherein the housing extends to a depth of no more than two inches measured from the front face.

21. The patch panel defined in claim 1, wherein the housing extends to a depth of no more than one inch measured from the front face.

22. The patch panel defined in claim 1, wherein the conductive pathways are located within the housing.

23. An architecture comprising:
the patch panel defined in claim 1;
first equipment with first cabling connected to the second connectors of the patch panel; and
second equipment with second cabling connected to the third connectors of the patch panel.

24. The architecture defined in claim 23, wherein the first cabling carries voice signals and wherein the second cabling carries data signals.

25. The architecture defined in claim 24, wherein the voice signals and the data signals are delivered using Internet Protocol packets.

26. The architecture defined in claim 23, further comprising a plurality of device-side splitters connected via third cabling to the first connectors of the patch panel.

27. The architecture defined in claim 26, wherein the first equipment comprises an edge device for exchanging IP telephony traffic with a central office.

28. The architecture defined in claim 27, wherein the second equipment comprises a switch device for exchanging Internet traffic with a remote access server.

29. An architecture comprising:
a first patch panel and a second patch panel, each of the first and second patch panel comprising:
a housing exhibiting a front face;
a plurality of first connectors, each said first connector providing external access via the front face to a set of conductor terminals, the set of conductor terminals including a first subset and a second subset;
a plurality of second connectors, each said second connector corresponding to one of the first connectors, each said second connector providing external access via the front face to a set of conductor terminals, the set of conductor terminals to which said second connector provides access via the front face being connected by respective conductive pathways to the first subset of conductor terminals to which the corresponding one of the first connectors provides access via the front face; and
a plurality of third connectors, each said third connector corresponding to one of the first connectors, each said third connector providing external access via the front face to a set of conductor terminals, the set of conductor terminals to which said third connector provides access via the front face being connected by respective conductive pathways to the second subset of conductor terminals to which the corresponding one of the first connectors provides access via the front face; and
a set of cables connecting the first connectors of the first patch panel with respective ones of the first connectors of the second patch panel.

30. The architecture defined in claim 29, further comprising:
first equipment connected to the second connectors of the second patch panel; and
second equipment connected to the third connectors of the second patch panel.

* * * * *